Oct. 16, 1928.

J. B. RICKER ET AL

SAW BRAZING CLAMP

Filed March 7, 1927

Oct. 16, 1928.  1,687,696
J. B. RICKER ET AL
SAW BRAZING CLAMP
Filed March 7, 1927   5 Sheets-Sheet 3

Inventors
Jerome B. Ricker
Edward T. Armstrong
Charles A. Person
Henry W. Armstrong Oct. 16, 1928.

J. B. RICKER ET AL

1,687,696

SAW BRAZING CLAMP

Filed March 7, 1927

Patented Oct. 16, 1928.

1,687,696

UNITED STATES PATENT OFFICE.

JEROME B. RICKER AND CHARLES A. PERSON, OF ENTERPRISE, AND EDWARD P. ARMSTRONG AND HENRY W. ARMSTRONG, OF PORTLAND, OREGON.

SAW-BRAZING CLAMP.

Application filed March 7, 1927. Serial No. 173,546

Our invention relates to saw-brazing clamps, and especially to saw-brazing clamps adapted for brazing thick band-saws of considerable width, as generally in use in large saw mills for sawing logs of considerable width and thickness. These band-saws are procured from the manufacturer in sections of any desired length and the ends are brazed together at the mill; and the same procedure is required to re-unite the ends when they become separated or the band-saw is broken in service.

It is, of course, important that the uniting of the ends of the band-saw be securely made so as to stand the severe strain imposed upon the saw as it cuts through the lumber at a speed of 10,000 feet per minute, more or less.

Unless the two ends of the band-saw are united securely and evenly along the entire length of the seam, this strain, which is tremendous, is liable to tear the saw blade apart at the seam, if there be any weakness in the brazed portion; and such tends to result if the saw-brazing clamp has failed to braze the seam along its entire length due to portions of the seam not being pressed firmly together, in short, by unequal pressure, or insufficient heat in the brazing irons.

Heretofore the ends of the saw-blade have been brazed by compressing the overlapped ends of the saw in a saw-brazing clamp, in which hot brazing irons have been placed, through the medium of screws, but this method is slow and the interval of time required for applying the force of compression is too great relatively to the rate at which the brazing irons tend to lose their heat.

Poor and weak connections are usually the result of the hot brazing irons having cooled and hardened in the clamp before the required pressure is applied to them, which causes unequal pressure to be brought to bear against the two ends of the saw blade being brazed together.

The brazing irons so used are subjected to heavy duty and abuse, and it is impossible to maintain them at a uniform thickness.

Further, saw blades vary in thickness across their width and the overlapped portions; that is, the seam will not be of uniform thickness along its entire length. In both the above cases it is necessary that some means be provided for compensating these variations in order that a uniform pressure may be quickly applied along the entire length of the seam.

In order to effect a perfect braze, i. e., unite the edges of the ends of the saw blade firmly together along the entire length of the union to be made, it is essential that the ends of the blades be firmly and uniformly compressed, and that this compression be applied very rapidly so that the hot brazing irons will not have cooled and hardened before the pressure is applied.

The object of our invention is to provide a saw-brazing clamp embodying pressure applying instrumentalities capable of being placed in action before the hot brazing irons have had time to cool to the degree rendered them ineffective.

We attain our object through the medium of a wedge or series of wedges forced into action by the blow of a sledge, or other quickly applied force, such as a rack and pinion with the latter capable of being revolved at a high speed; or by means of fluid pressure.

A further object of our invention is to provide a saw-brazing clamp which will be portable, efficient in operation, and economical of manufacture.

The details of construction and mode of operation of our invention will hereinafter be fully described with reference to the accompanying drawings:

In the drawings:

Fig. 5 shows a top plan view of our saw-brazing clamp and a saw, clamped therein, to be brazed;

Fig. 6 shows a section taken on a central longitudinal line of the frame member just to one side of the clamping hook and illustrates the relative arrangement of the different parts of our saw-brazing clamp and the saw-blade;

Fig. 7 shows a fragmentary section taken on the line 7—7 of Fig. 6, and illustrates further details of construction;

Figs. 7$^a$ and 7$^b$ show in a section taken similarly to Fig. 7, different relative arrangements of the wedge gibs;

Fig. 8 shows an enlarged fragmentary section, similar to Fig. 7, and illustrates the crushing of the brazing irons when pressure is applied;

Fig. 9 shows a section taken on the line 9—9 of Fig. 5;

Fig. 10 shows a fragmentary side elevation of our saw-brazing clamp and a section taken on the line 10—10 of Fig. 5;

Fig. 11 shows a section taken on the line 11—11 of Fig. 5, and shows the details of construction of one of the saw holding clamps;

Referring now to Figs. 1 to 11, our invention comprises a table $a$ supported by legs $b$ which are provided with casters $c$, transverse saw holding clamps $d$ and a centrally located transverse frame member $n$.

The frame member $n$ is hinged to the table $a$ by a pin $s$, which is supported in upstanding lugs $o$, and one end of the pin $s$ which extends beyond one of the lugs $o$ is provided with a helical spring $u$, fixed at one end to the pin and at the other to the lug $o$, and is contained in a housing $r$, and serves as a balancing spring; that is, the frame member is held normally in a raised position when unclamped from the table, and without which the frame member would be very unwieldy as it is of considerable weight.

Shoulders $n'$ and $n^4$ are provided on the hinged end of the frame member adapted to limit the movement of the frame member $n$ on the lugs $o$ by means of a pin $o'$.

Figures 5, 6, 7, 7A, 7B, 8, 9, 10, 11:
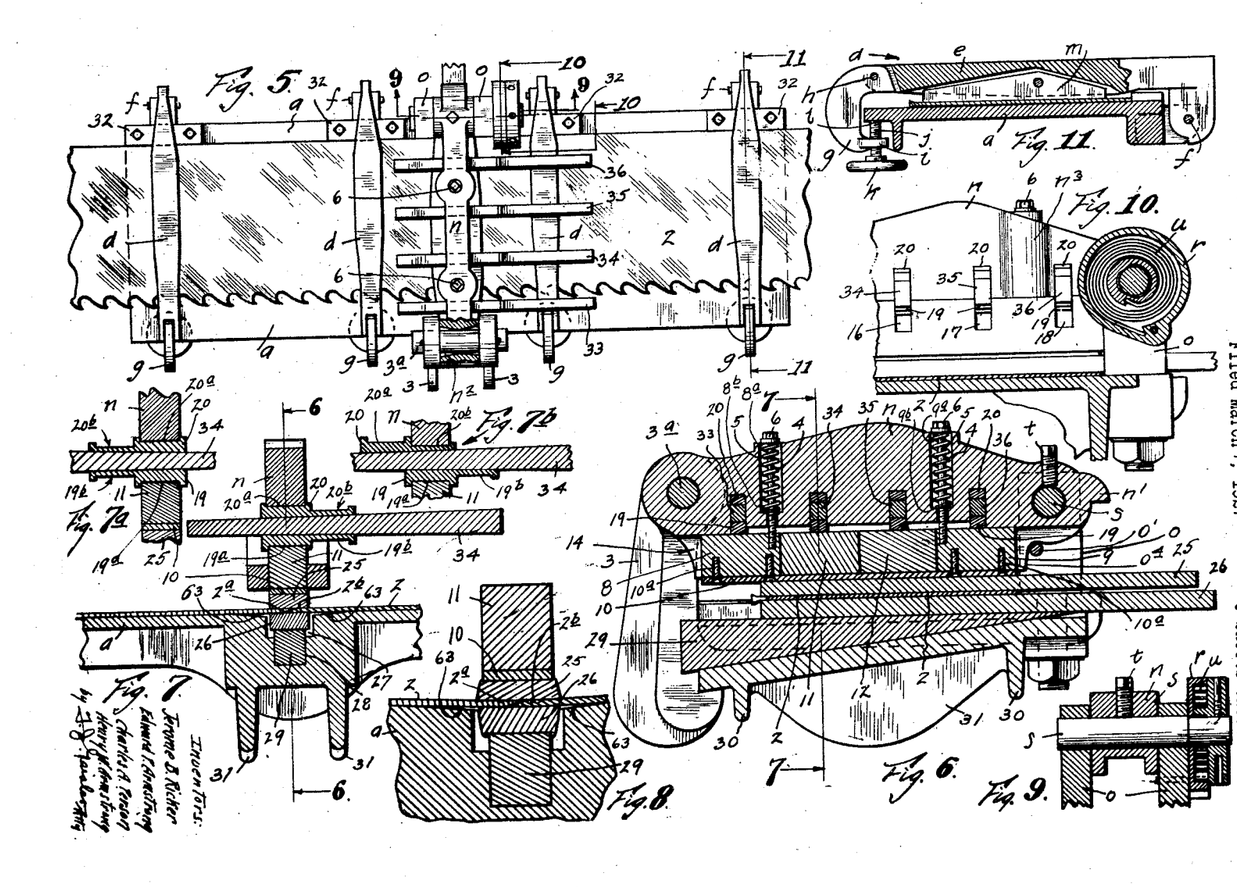
Figures 12, 14:
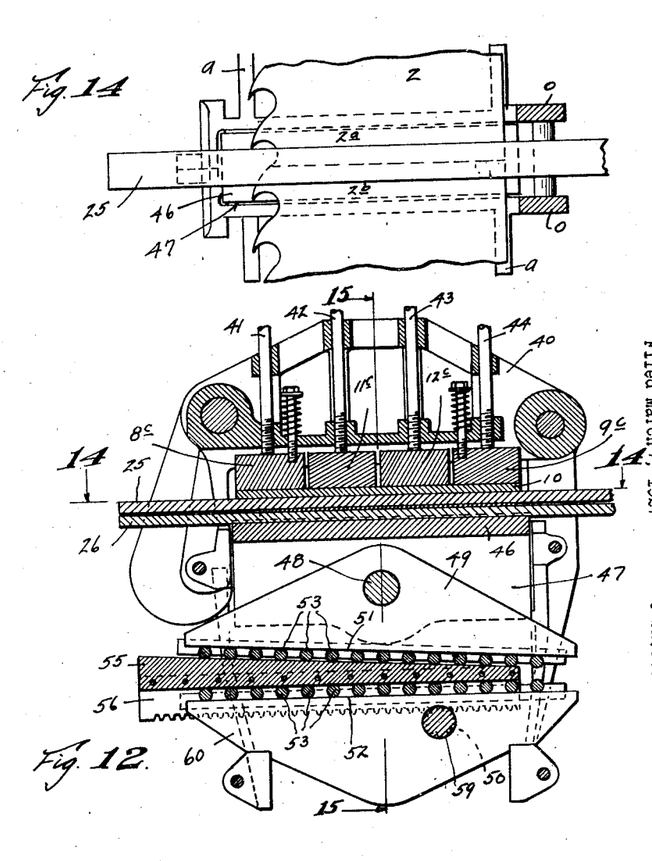
Fig. 12 shows in a section taken on the line 12—12 of Fig. 15, looking in the direction of the arrows, our saw-brazing clamp similar to Fig. 6, except that a modification of the pressure applying means are provided.
Fig. 14 shows a section taken on the line 14—14 of Fig. 12, and illustrates by dotted lines the relative position of the saw blade and the lower pressure bar.

The free end of the frame member $n$ is provided with two clamping hooks 3, adapted to engage the underside of the table $a$, as shown in Fig. 6. The hooks 3 are mounted on each end of a pin 3$^a$ which bears in a hole $n^2$ in the frame member which is bored so as to be hyperbolic in cross section so that the pin 3$^a$ will bear on the central portion of the bore and thus the strain on the clamping hooks 3 will tend to be equalized.

In a longitudinal channel 14 of the frame member are arranged pressure blocks 8, 9, 11 and 12 which are supported on a pressure bar 10, the two outer pressure blocks 8 and 9 being bolted thereon by bolts 10$^a$.

The two outer pressure blocks 8 and 9 are also provided with studs 5 which extend upwardly through slots 8$^a$ and 9$^a$, reenforced by bosses $n^3$, and the said slots are larger than the studs 5 except for shoulders 8$^b$ and 9$^b$ in their lower ends.

Over the studs 5 are provided compression coil springs 4 which bear against nuts and washers 6 on their upper ends and against the shoulders 8$^b$ and 9$^b$ adjacent their lower ends.

Thus the pressure bar 10 and the pressure blocks 8, 9, 11 and 12 are held together as a unit by the bolts 10$^a$, the studs 5, and the springs 4.

Slots 15, 16, 17 and 18 are provided transversely through the channel portion 14 of the frame member in which are seated upper and lower wedge gibs 19 and 20 preferably of bronze, which bear on each side of wedges 21, 22, 23 and 24, Figs. 7, 7ª, and 7ᵇ. The wedge gibs 19 and 20 of which there are two for each wedge, are formed in two portions, the portions 19ª and 20ª being of greater thickness than the portions 19ᵇ and 20ᵇ, in this way providing for the use of brazing irons and saws of different thicknesses.

Pressure wedges 33, 34, 35 and 36 are adapted to be received in the slots 15, 16, 17 and 18 respectively, between either portions 19ª, or 20ª of the upper and lower gibs 19 and 20.

Brazing irons 25 and 26 are provided to be inserted one above the saw blade 2, between the saw blade and the pressure bar 10, and the other below the saw blade in a transverse groove 27, in the bottom of which a secondary groove 28 is formed adapted to receive a positioning wedge 29 and upon which the lower brazing iron 26 will be supported.

Figures 1, 2, 3, 4:
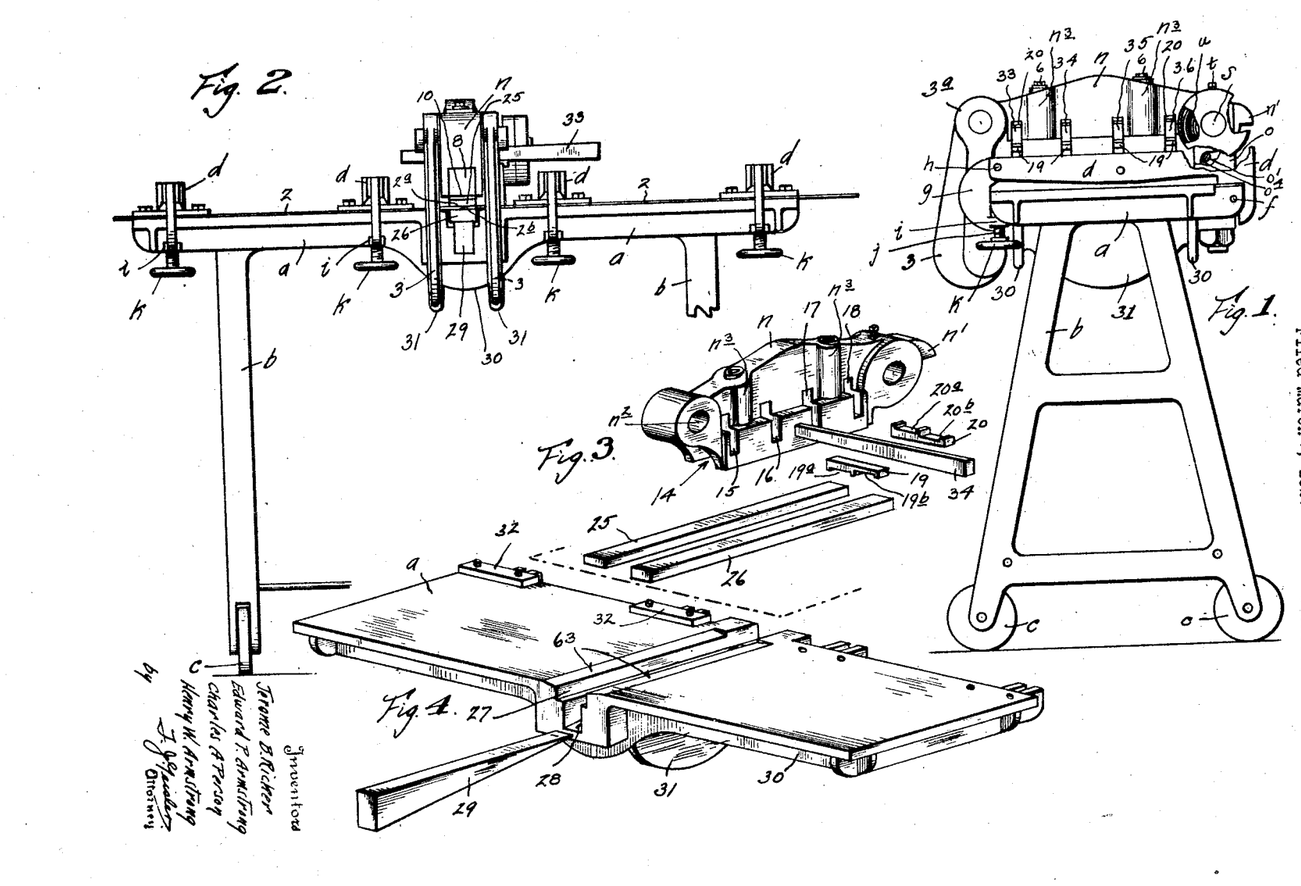
Fig. 1 shows an end elevation of our saw brazing clamp comprising the table and supports, and illustrates the saw-holding clamps and hinged frame member in which are contained the pressure blocks and pressure wedges.
Fig. 2 shows a side elevation of our saw brazing clamp, one of the supports being broken away and illustrates the relative arrangement of the saw-holding clamps and hinged frame member.
Fig. 3 shows a perspective view of the frame member removed from the table, a pressure wedge, the brazing irons, and the wedge gibs.
Fig. 4 shows a perspective view of the table with the various parts removed and the positioning wedge.

Longitudinal flanges 30 and transverse flanges 31 are provided on the underside of the saw table, beneath the saw brazing clamp to reenforce the table at this point against the considerable strains which it must support, and back guides 32 are provided bolted to the edge of the saw table, Fig. 4, which serve as guides for alining the saw in the clamps.

The saw holding clamps $d$, Fig. 11, comprise arms $e$ hinged to the table at $f$ and provided with hooks $g$, which are hinged to the arms $d$ as at $h$ and which are provided on their points with a circular tip $i$, provided with a hole through which clamping screws $j$ are threaded. The clamping screws $j$ bear against the underside of the table $a$ as at $l$, which are operated by hand wheels $k$ and by locating the screws $j$ and the wheels $k$ on the underside of the table, they will not interfere with the operation of our saw-brazing clamp, when the wedges 33, 34, 35 and 36 are driven into the frame member by the blows of a hammer.

The arms $e$ are cut away on their underside and in these spaces are provided centrally pivoted supplementary clamping surfaces $m$, shorter in length than the cut-away portions, thus providing a clamping surface always parallel with the table.

The method of brazing the two ends of a band saw together and the operation of our saw brazing clamp is as follows:

The two ends 2ª and 2ᵇ, Fig. 8, of a band saw 2 are first ground to a thin bevel edge, Figs. 7 and 8, and are then placed with sufficient brazing compound between their two laps, such as silver solder, over the transverse groove 27 of the table, the remainder of the saw blade being disposed underneath the table between the legs $b$. The saw will be clamped to the table by the saw holding clamps $d$, the saw having been alined properly by the saw guides 32.

The frame member $n$ is then lowered and hooked in position, Fig. 6, the cold brazing irons are inserted one above the blade, one below, and the positioning wedge 29 is adjusted so as to bring the brazing irons uniformly against the saw blade and the pressure bar 10, and to hold the saw blade parallel and coincident with the plane of the table top.

The portion of the wedge gibs of the proper thickness are selected, Figs. 7, 7ª, and 7ᵇ, and with the wedges 33, 34, 35 and 36 are placed in the slots 15, 16, 17 and 18 ready to be used.

The brazing irons 25 and 26 are then removed and heated in a convenient furnace, to a cherry heat, and are then quickly inserted in the saw-brazing clamp and the wedges 33, 34, 35 and 36 are rapidly driven into the slots 15, 16, 17 and 18 by any suitable means such as a hammer.

Thus the pressure blocks 8, 9, 11 and 12 are forced down on the pressure bar 10, which being more or less inflexible, distribute any variations in pressure from the wedges equally along the overlapped ends on the seam of the saw blade, but at the same time allows sufficient movement to accommodate the expansive action of the said wedges.

By this construction, the hot brazing irons will have been inserted in our saw-brazing clamp, the pressure applied quickly and uniformly, before the hot brazing irons have cooled any appreciable amount, and the braze formed in a fraction of the time heretofore required in this operation.

On each side at the transverse groove 27 the surface of the saw table is slightly beveled as at 63, Fig. 8, which provides a certain amount of adjustment for the ends of the saw blade to the pressure and also allows the upper and lower brazing irons to crush and flatten under pressure, Fig. 8, thus adjusting their own variations in thickness and those of the overlapped portions of the saw blade, no matter how minute, so as to insure equal contact at all points on the seam of the saw blade, thereby insuring equal pressure and a perfectly brazed seam, and to avoid any tendency of the saw blade to bend against the edges of the groove 27.

Referring now to Figs. 12 to 15, we provide a modification of our saw-brazing clamp in which the positioning wedge and the pressure wedges are eliminated and screws 41, 42, 43 and 44 are provided which are threaded through a frame member 40 and against pressure blocks 8ᶜ, 9ᶜ, 11ᶜ and 12ᶜ.

Figure 13:
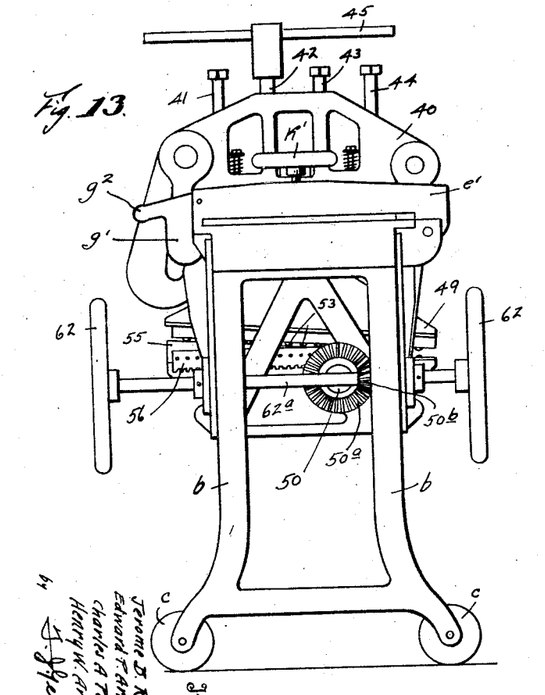
Fig. 13 shows an end elevation of our saw-brazing clamp as shown in Fig. 12, and illustrates the hand wheels provided for operating the pressure applying means.

The screws 41, 42, 43 and 44 are provided with square heads which may be conveniently operated by a T handle socket wrench 45, Fig. 13. By these means the relative positions of each pressure block 8ᶜ, 9ᶜ, 11ᶜ and 12, may be adjusted so as to bear equally on the pressure bar 10.

A lower pressure bar 46 is provided in a transverse groove 47 in the saw table beneath a lower pressure bar 46 and is supported by a vertically movable member 47 to which an obtuse triangular member 49 is rotatably fastened at its apex by a pin 48 and a similar member 60 is provided beneath the member 49, the longer sides 51 and 52 of each member being opposed and the lower member 60 is fixed to the frame of the saw table and a shaft 50 is journaled therein, and also on the frame of the saw table.

On each of the adjacent sides 51 and 52 of the members 49 and 60 are provided a number of rollers 53 which are held in place by any suitable means, not shown.

A wedge 55 is inserted between the sides 51 and 52 of the members 49 and 60, and the rollers 53, which is provided on each of its sides with downwardly extending toothed racks 56, the toothed portions which are parallel to the central axis of the wedge 55 and mesh with two toothed peripheral portions on the shaft 50, and on the other end of the shaft 50 is provided a bevel gear 50ª, which meshes with a bevel pinion gear 50ᵇ mounted on a shaft 62ª, journaled in the frame to each end of which are fixed hand wheels 62.

By these means, the shaft 50 and the toothed peripheral portions 59 are rotated thus forcing the wedge 55 by means of the rollers 53 easily and rapidly between the members 49 and 60 and thus applying heavy pressure rapidly from below on the lower pressure bar 46.

Figures 15, 16:
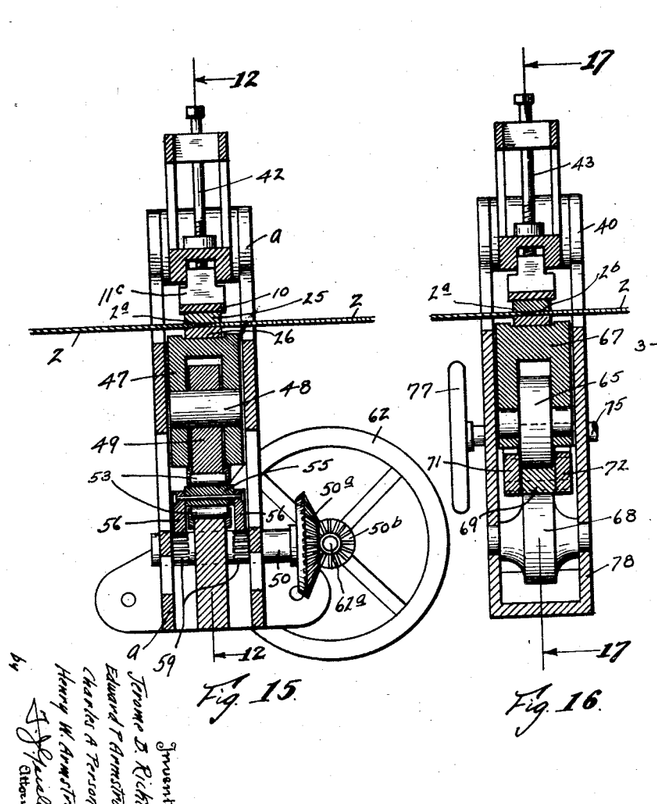
Fig. 15 shows a section taken on the line 15—15 of Fig. 12, and illustrates further details of construction of the former figure.
Fig. 16 shows a section taken on the line 16—16 of Fig. 17, looking in the direction of the arrows, similar to Fig. 15, except that two large rollers have been provided in the place of several small rollers, for operating the pressure applying means.
Figure 17:
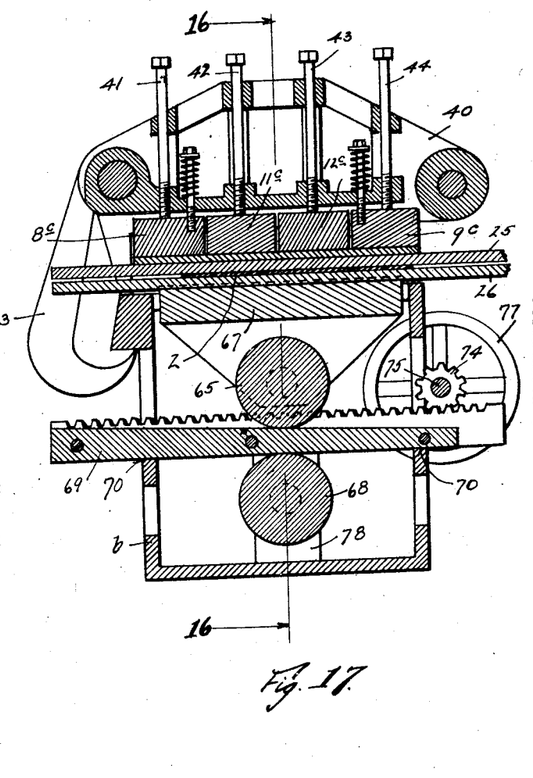
Fig. 17 shows a transverse section of our saw-brazing clamp taken on the line 17—17 of Fig. 16, looking in the direction of the arrows, and illustrates the relative arrangements of the various parts of this modification.

Referring now to Figs. 16 and 17, we show another form of our saw-brazing clamp similar in all respects to the above described modification, except that in the place of the rollers 53, two large rollers 65 and 68 are substituted, one of which is rotatably mounted on the triangular lower portion of a member 66, which is mounted for vertical movement in the frame of the saw table, and on which the lower pressure bar 67 is supported and the other roller 58 is rotatably mounted below the upper roller 65, on a lower fixed member 78, and a wedge 69 is arranged between the rollers and supported and guided in slots 70 in the table frame. The lower edge of the wedge 70 is parallel to its central axis and upstanding toothed racks 71 and 72 are fixed to each side of the wedge, the toothed portions of which are parallel with the lower edge of the wedge and which mesh with a pinion gear 74 mounted on a shaft 75, which is journaled in the table frame, and which is provided with hand wheels 77 by which the pinion 74 will be rotated, and the wedge 69 will thus be forced between the rollers 65 and 68 and the members 66 will be moved upward against the pressure bar 67.

As shown in Fig. 13, I provide a modification of the saw holding clamp e′ in which the hand screw k′ is arranged above the clamp and in which the hook g is provided with a handle g² for manual engagement.

In both modifications of our saw-brazing clamp, the operation will be substantially the same, that is, the pressure within the clamp will be supplied from below by means of the wedge 55 or the wedge 69 which will be forced between the rollers 53 or the two large rollers 65 and 68 by means of the toothed racks and the gears 50ª, 50ᵇ or 74 when rotated by their respective hand wheels. Thus considerable pressure is exerted and is transmitted to the brazing irons and the saw blade, which has been rapidly generated and uniformly applied.

Figures 18, 20:
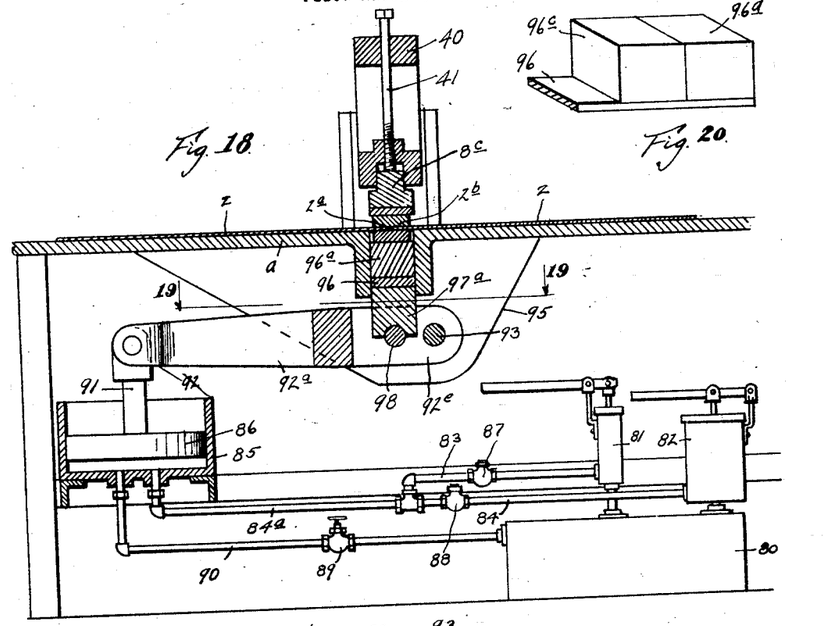
Fig. 18 shows in a section taken on the line 18—18 of Fig. 19, looking in the direction of the arrows, our saw-brazing clamp adapted for being operated by fluid pressure and illustrates diagrammatically the means therefor.
Fig. 20 shows a fragmentary perspective view of the lower pressure blocks provided in our saw-brazing clamp as shown in Figs. 18 and 19.
Figure 19:
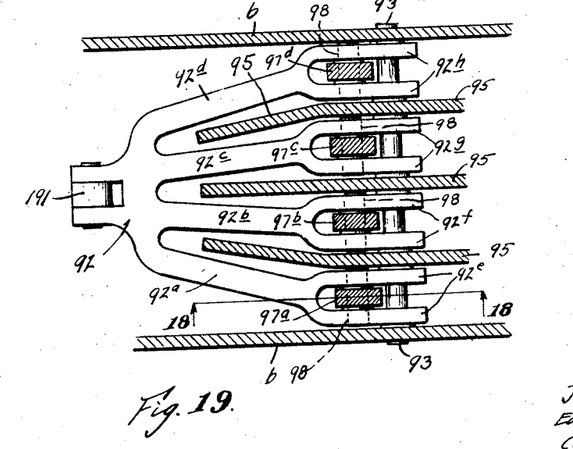
Fig. 19 shows a section taken on the line 19—19 of Fig. 18, and shows the lever adapted for transmitting pressure to the brazing irons from the fluid pressure means.

Referring now to Figs. 18 and 19, we provide a fluid pressure means for operating our saw-brazing clamp, comprising a reservoir 80 to which are connected a rapid acting hand pressure pump 82, and a relatively slower acting pump 81.

The pump 82 is adapted to bring the lower pressure bar quickly into operative position, and the pump 81 is adapted for applying a heavier pressure with which to complete the brazing operation by applying sufficient pressure to crush the hot brazing irons and thus equalize the pressure at all points along the seam, and thus form a perfect braze.

The pumps 81 and 82 are connected by pressure lines 83 and 84 to a main pressure line 84ª which leads to a cylinder 85 in which is located a piston 86 adapted to be actuated by the fluid pressure.

Suitable check valves 87 and 88 are provided in the pressure lines 83 and 84 to prevent the black flow of pressure, and a manually operated release valve 89 is provided in the discharge line 90 from the cylinder 85 to the reservoir 80.

Pivoted to the stem 91 of the piston 86 is a lever 92 comprising divergent arms 92ª, 92ᵇ, 92ᶜ, and 92ᵈ which are journaled on a shaft 93 which is journaled in the frame and additionally supported by downwardly projecting webs 95, integral parts of the table.

A lower pressure bar 96 is supported on members 97ª, 97ᵇ, 97ᶜ and 97ᵈ, which bear on the pins 98, mounted between forked ends 92ᵉ, 92ᶠ, 92ᵍ and 92ʰ of the divergent arms 92ª, 92ᵇ, 92ᶜ and 92ᵈ.

Thus when the piston 86 is forced upward, by pressure in the cylinder 85, the lever 92 being fulcrumed on the shaft exerts a leverage on the downwardly extending portions 97ª, 97ᵇ, 97ᶜ and 97ᵈ and force the lower pressure bar 96 upwardly. On the lower pressure bar 96 are provided lower pressure blocks 96ª, 96ᵇ, 96ᶜ, and 96ᵈ, which are adapted to bear directly on the underside of the brazing iron 26, and in this manner, pressure is applied on the two ends 2ª and 2ᵇ of the band saw 2 which is evenly distributed and uniformly applied.

In short, the operation of our saw-brazing clamp comprises placing the saw blade on the table, with the two ends over the transverse groove, alining the blade with the back guides 32 and clamping the blade in position with the saw holding clamps d.

Then the frame member will be brought down over the two ends of the saw and hooked in position and the pressure blocks are adjusted with relation to the cold brazing irons, which have been temporarily inserted in our saw-brazing clamp.

Finally, the brazing irons are removed, heated, quickly inserted in the clamp, pressure applied, and the operation is finished.

Sufficient time is then allowed for the brazing irons to cool until they have lost their color and the braze is completed and the saw may be removed, having been efficiently and quickly united.

We claim:

1. In a saw-brazing clamp comprising a brazing-table and means for securing on the table the saw ends to be brazed, means for applying pressure to the seam of the saw, comprising a frame-member, a series of independently adjustable pressure-blocks carried by said frame-member, a wedge element cooperating with each pressure-block, said wedge elements composed of wedges of gradual taper and companion gibs secured in said frame between which said wedges are inserted.

2. In a saw-brazing clamp comprising a brazing-table and means for securing on the table the saw ends to be brazed, means for applying pressure to the seam of the saw, comprising a frame-member, a series of independently adjustable pressure-blocks carried by said frame-member, a wedge-element cooperating with each pressure-block, said wedge elements composed of wedges of gradual taper and reversible companion gibs secured in said frame between which said wedges are inserted.

3. In a saw-brazing clamp comprising a brazing-table and means for securing on the table the saw ends to be brazed, means for applying pressure to the seam of the saw, comprising a frame-member, a series of independently adjustable pressure-blocks carried by said frame-member, a wedge element cooperating with each pressure-block, said wedge-elements composed of elongate wedges of gradual taper and elongate companion gibs secured in said frame between which said wedges are inserted, said gibs having ends of different thicknesses, whereby either end of one gib may be placed in service with either end of a companion gib.

4. In a saw-brazing clamp comprising a brazing-table and means for securing on the table the saw ends to be brazed, means for applying pressure to the seam of the saw, comprising a frame-member, a series of independently adjustable pressure-blocks carried by said frame-member, a wedge-element cooperating with each pressure-block, said wedge-elements composed of elongate wedges of gradual taper and elongate companion gibs secured in said frame between which said wedges are inserted, said gibs having ends of different thicknesses, whereby either end of one gib may be placed in service with either end of a companion gib, and said gibs being reversible whereby the wedges may be driven in at either side of the said frame-member.

5. In a saw-brazing clamp comprising a brazing-table, and means for securing on the table the saw ends to be brazed, means for applying pressure to the seam of the saw, comprising a movable frame member and devices for securing the same in fixed relation to said table, a series of independently adjustable pressure-blocks carried by said frame-member, and a wedge element cooperating with each pressure-block.

6. In a saw-brazing clamp comprising a brazing-table and means for securing on the table the saw ends to be brazed, means for applying pressure to the seam of the saw, comprising a balanced frame-member hinged at one end to the table, and devices for securing the free end of the frame-member to the table, a series of independently adjustable pressure-blocks carried by said frame-member, and a wedge element cooperating with each pressure block.

7. In a saw-brazing clamp comprising a brazing-table and means for securing on the table the saw ends to be brazed, means for applying pressure to the seam of the saw, comprising a frame-member hinged at one end to the table, means for supporting the frame-member in inactive position, and devices for securing the free end of the frame-member to the table, a series of independently adjustable pressure-blocks carried by said frame-member, and a wedge-element cooperating with each pressure-block.

8. In a saw-brazing clamp comprising a brazing-table and means for securing on the table the saw ends to be brazed, means for applying pressure to the seam of the saw, comprising a balanced frame-member hinged at one end to the table, means for supporting the frame-member in inactive position, and devices for securing the free end of the frame-member to the table, a series of independently adjustable pressure-blocks carried by said frame-member, and a wedge-element cooperating with each pressure-block.

9. In a saw-brazing clamp comprising a brazing-table and means for securing on the table the saw ends to be brazed, means for applying pressure to the seam of the saw, comprising a frame-member, a series of independently adjustable spaced pressure-blocks carried by said frame-member, a plate carried by said pressure-blocks, other pressure blocks inserted between said spaced pressure blocks, and a wedge element co-operating with each pressure block.

10. In a saw brazing clamp comprising a table and means for securing on the table the saw end to be brazed, a frame member hinged transversely of the table and adapted to be clamped over the lapped ends of the saw, a saw brazing iron carried by said frame member, a transverse groove provided in said table adapted to receive another saw brazing iron, mechanical means comprising wedge elements adapted for applying pressure to the said brazing irons and the surface of the table adjacent the said groove sloping slightly toward the groove whereby as pressure is applied to the said brazing irons and the lapped ends of the saw therebetween, the brazing irons will be permitted to crush and flatten, such movement being accommodated by said sloping portions of the table and even and uniform pressure will be applied thereto.

11. In a saw brazing clamp comprising a table and means for securing on the table the saw end to be brazed, a frame member hinged transversely of the table and adapted to be clamped over the lapped ends of the saw, a saw brazing iron carried by said frame member, a transverse groove provided in said table adapted to receive another saw brazing iron, mechanical means for applying pressure to the said brazing irons and the surface of the table adjacent the said groove sloping slightly toward the groove whereby as pressure is applied to the said brazing irons and the lapped ends of the saw therebetween, the brazing irons will be permitted to crush and flatten, such movement being accommodated by said sloping portions of the table and even and uniform pressure will be applied thereto.

12. In a saw brazing clamp comprising a table, a balanced frame member hinged transversely of the table and a hook provided on the opposite end of the frame member adapted to hold the said frame member in its operative position, a series of independently adjustable pressure-blocks carried by said frame member, a plate carried by said pressure-blocks, other pressure blocks inserted between said spaced pressure-blocks, a wedge element cooperating with each pressure-block, said wedge elements composed of wedges of gradual taper and companion gibs secured in said frame between which said wedges are inserted and said gibs having ends of different thicknesses, whereby either end of one gib may be placed in service with either end of a companion gib.

13. In a saw brazing clamp comprising a table, a balanced frame member hinged transversely of the table, and a hook provided on the opposite end of the frame member adapted to hold the said frame member in its operative position, a series of independently adjustable pressure-blocks carried by said frame member, a plate carried by said pressure-blocks, other pressure-blocks inserted between said spaced pressure-blocks, a wedge element cooperating with each pressure-block, said wedge elements composed of elongate wedges of gradual taper and elongate companion gibs secured in said frame between which said wedges are inserted and said gibs having ends of different thicknesses, whereby either end of one gib may be placed in service with either end of a companion gib.

14. In a saw brazing clamp comprising a table, a balanced frame member hinged transversely of the table and a hook provided on the opposite end of the frame member adapted to hold the said frame member in its operative position, a series of independently adjustable pressure-blocks carried by said frame member, a plate carried by said pressure-blocks, other pressure blocks inserted between said spaced pressure-blocks, a wedge element cooperating with each pressure-block, said wedge elements composed of elongate wedges of gradual taper and elongate reversible companion gibs secured in said frame between which said wedges are inserted and said gibs having ends of different thicknesses, whereby either end of one gib may be placed in service with either end of a companion gib and said gibs being reversible whereby the wedges may be driven in at either side of the said frame member.

15. In a saw brazing clamp comprising a table, a balanced frame member hinged transversely of the table and a hook provided on the opposite end of the frame member adapted to hold the said frame member in its operative position, a series of independently adjustable pressure-blocks carried by said frame member and means for applying substantially uniform pressure to the ends of the saw, comprising a wedge element forced between said pressure blocks and said table.

16. In a saw brazing clamp comprising a table, a balanced frame member hinged transversely of the table and a hook provided on the opposite end of the frame member adapted to hold the said frame member in its operative position, a series of independently adjustable pressure-blocks carried by said frame member, means for applying substantially uniform pressure to the ends of the saw, comprising a wedge element forced between said pressure blocks and said frame member, elongate companion gibs secured in said frame between which said wedge element is inserted and said gibs having ends of different thicknesses, whereby either end of one gib may be placed in service with either end of a companion gib.

17. In a saw brazing clamp comprising a table, a balanced frame member hinged transversely of the table and a hook provided on the opposite end of the frame member adapted to hold the said frame member in its operative position, a series of independently adjustable pressure-blocks carried by said frame member, means for applying substantially uniform pressure to the ends of the saw, comprising a wedge element forced between said pressure blocks and said frame member, elongate reversible companion gibs secured in said frame between which said wedge element is inserted and said gibs having ends of different thicknesses, whereby either end of one gib may be placed in service with either end of a companion gib and said gibs being reversible whereby the wedges may be driven in at either side of the said frame member.

18. In a saw brazing clamp comprising a table, a balanced frame member hinged transversely of the table, means for supporting the member in an inoperative position and a hook provided on the opposite end of the frame member adapted to hold the said frame member in its operative position, a series of independently adjustable pressure-blocks carried by said frame member, means for applying substantially uniform pressure to the ends of the saw, comprising a wedge element forced between said pressure blocks and said frame member, elongate reversible companion gibs secured in said frame between which said wedge element is inserted and said gibs having ends of different thicknesses, whereby either end of one gib may be placed in service with either end of a companion gib and said gibs being reversible whereby the wedges may be driven in at either side of the said frame member.

HENRY W. ARMSTRONG.
EDWARD P. ARMSTRONG.
JEROME B. RICKER.
CHARLES A. PERSON.